United States Patent
Novlan et al.

(10) Patent No.: US 10,334,618 B2
(45) Date of Patent: Jun. 25, 2019

(54) METHODS FOR EFFICIENT OPERATION OF LTE CELLS ON UNLICENSED SPECTRUM

(71) Applicant: Samsung Electronics Co., Ltd., Suwon-si, Gyeonggi-do (KR)

(72) Inventors: Thomas Novlan, Dallas, TX (US); Boon Loong Ng, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/924,538

(22) Filed: Oct. 27, 2015

(65) Prior Publication Data

US 2016/0128084 A1    May 5, 2016

Related U.S. Application Data

(60) Provisional application No. 62/073,793, filed on Oct. 31, 2014, provisional application No. 62/098,952, filed on Dec. 31, 2014.

(51) Int. Cl.
*H04W 72/12* (2009.01)
*H04W 74/08* (2009.01)

(52) U.S. Cl.
CPC .... *H04W 72/1268* (2013.01); *H04W 72/1252* (2013.01); *H04W 74/0808* (2013.01)

(58) Field of Classification Search
CPC ......... H04W 72/1268; H04W 74/0808; H04W 72/1252
See application file for complete search history.

(56) References Cited

U.S. PATENT DOCUMENTS

| | | | |
|---|---|---|---|
| 2006/0050727 A1* | 3/2006 | Matsunaga | H04B 7/2687 370/445 |
| 2007/0206547 A1 | 9/2007 | Gong et al. | |
| 2008/0232487 A1* | 9/2008 | Cleveland | H04L 5/0007 375/260 |

(Continued)

FOREIGN PATENT DOCUMENTS

WO    WO 2014/051606    4/2014

OTHER PUBLICATIONS

International Search Report and Written Opinion issued for PCT/KR2015/011599 dated Mar. 31, 2016, 12 pgs.

(Continued)

*Primary Examiner* — Chirag G Shah
*Assistant Examiner* — Joshua Smith

(57) ABSTRACT

A method for efficient data transmission in a wireless communication system includes dynamically configuring at least one period cycle (P-CYCLE) pattern comprising a period-on (P-ON) duration and a period-off (P-OFF) duration that are adjusted in accordance with a number of transmissions from user equipments (UEs) operating in a shared band spectrum, wherein the number of transmissions comprises a number of successful transmissions or a number of unsuccessful transmissions received from the UEs. The method further includes transmitting the P-CYCLE pattern including the P-ON duration and the P-OFF duration to the UEs using a downlink channel over the shared spectrum band, wherein the downlink channel comprises a higher layer signal or a physical layer signal.

20 Claims, 9 Drawing Sheets

(56) References Cited

U.S. PATENT DOCUMENTS

| | | | |
|---|---|---|---|
| 2009/0154401 A1* | 6/2009 | Arora | H04W 24/10 370/329 |
| 2010/0177722 A1* | 7/2010 | Guvenc | H04W 52/244 370/329 |
| 2012/0039284 A1 | 2/2012 | Barbieri et al. | |
| 2013/0205012 A1* | 8/2013 | Lee | H04L 12/4035 709/224 |
| 2013/0208587 A1 | 8/2013 | Bala et al. | |
| 2013/0301446 A1* | 11/2013 | Chen | H04W 72/0413 370/252 |
| 2013/0315152 A1* | 11/2013 | Ratasuk | H04W 76/14 370/329 |
| 2014/0065974 A1* | 3/2014 | Sane | H04W 52/0254 455/67.11 |
| 2015/0018002 A1* | 1/2015 | Touag | H04W 16/14 455/454 |
| 2015/0163681 A1* | 6/2015 | Sadek | H04W 16/08 455/446 |
| 2015/0163801 A1 | 6/2015 | Sadek | |
| 2015/0163823 A1 | 6/2015 | Sadek et al. | |
| 2015/0163825 A1 | 6/2015 | Sadek et al. | |

OTHER PUBLICATIONS

ETRI, "Generalized Energy Transmission Field for LBT and Back-Off Based Co-Channel Coexistence Mechanism", R1-143964, 3GPPTSG-RAN1#78b, Sep. 27, 2014, 3 pgs.

* cited by examiner

METHODS FOR EFFICIENT OPERATION OF LTE CELLS ON UNLICENSED SPECTRUM

CROSS-REFERENCE TO RELATED APPLICATION(S) AND CLAIM OF PRIORITY

The present application claims priority to U.S. Provisional Patent Application Ser. No. 62/073,793, filed Oct. 31, 2014, entitled "METHODS FOR EFFICIENT OPERATION OF LTE CELLS ON UNLICENSED SPECTRUM" and U.S. Provisional Patent Application Ser. No. 62/098,952, filed Dec. 31, 2014, entitled "METHODS FOR EFFICIENT OPERATION OF LTE CELLS ON UNLICENSED SPECTRUM". The content of the above-identified patent document is incorporated herein by reference.

TECHNICAL FIELD

The present invention relates generally to wireless communication systems and, more specifically, to a method for efficient operation of LTE cells on unlicensed spectrum.

BACKGROUND

A long term evolution (LTE) radio access technology (RAT) may be deployed on an unlicensed frequency spectrum, which is also known as LTE-Unlicensed (LTE-U). One of possible deployment scenarios for the LTE-U is to deploy an LTE-U carrier as a part of carrier aggregations, where an LTE-U carrier is aggregated with another carrier on a licensed spectrum. In a conventional arrangement, a carrier on a licensed spectrum is assigned as a primary cell (PCell) and a carrier on an unlicensed spectrum is assigned as a secondary cell (SCell) for a UE. Since there may be other RATs operating on the same unlicensed spectrum as the LTE-U carrier, there is a need to enable co-existence of other RAT with LTE-U on an unlicensed frequency spectrum without undesirable interference between heterogeneous RATs.

SUMMARY

Embodiments of the present disclosure provide an efficient operation of LTE cells on an unlicensed spectrum.

In one embodiment, a method for efficient data transmissions in a wireless communication system is provided. The method includes dynamically configuring at least one period cycle (P-CYCLE) pattern comprising a period-on (P-ON) duration and a period-off (P-OFF) duration that are adjusted in accordance with a number of transmissions from user equipments (UEs) operating in a shared band spectrum. The number of transmissions comprises a number of successful transmissions or a number of unsuccessful transmissions received from the UEs. The method further includes transmitting the P-CYCLE pattern including the P-ON duration and the P-OFF duration to the UEs using a downlink channel over the shared spectrum band, wherein the downlink channel comprises a higher layer signal or a physical layer signal. An apparatus for performing this method is also provided.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The teens "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v11.2.0, "E-UTRA, Physical channels and modulation" (REF1); 3GPP TS 36.212 v11.2.0, "E-UTRA, Multiplexing and Channel coding" (REF2); 3GPP TS 36.213 v11.2.0, "E-UTRA, Physical Layer Procedures" (REF3); 3GPP TS 36.872 v12.0.0, "Small cell enhancements for E-UTRA and E-UTRAN-Physical layer aspects" (REF4); and 3GPP TS 36.133 v11.7.0, "E-UTRA, Requirements for support of radio resource management" (REF5).

Figure 1:
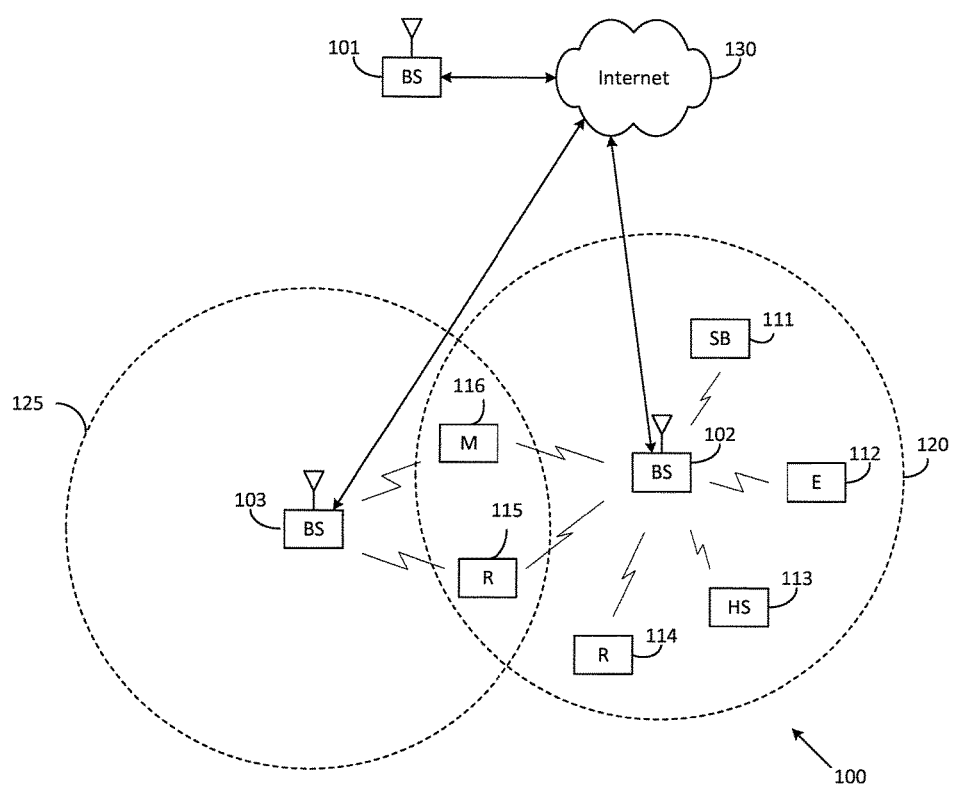
FIG. 1 illustrates an example wireless network according to embodiments of the present disclosure.
Figure 2:
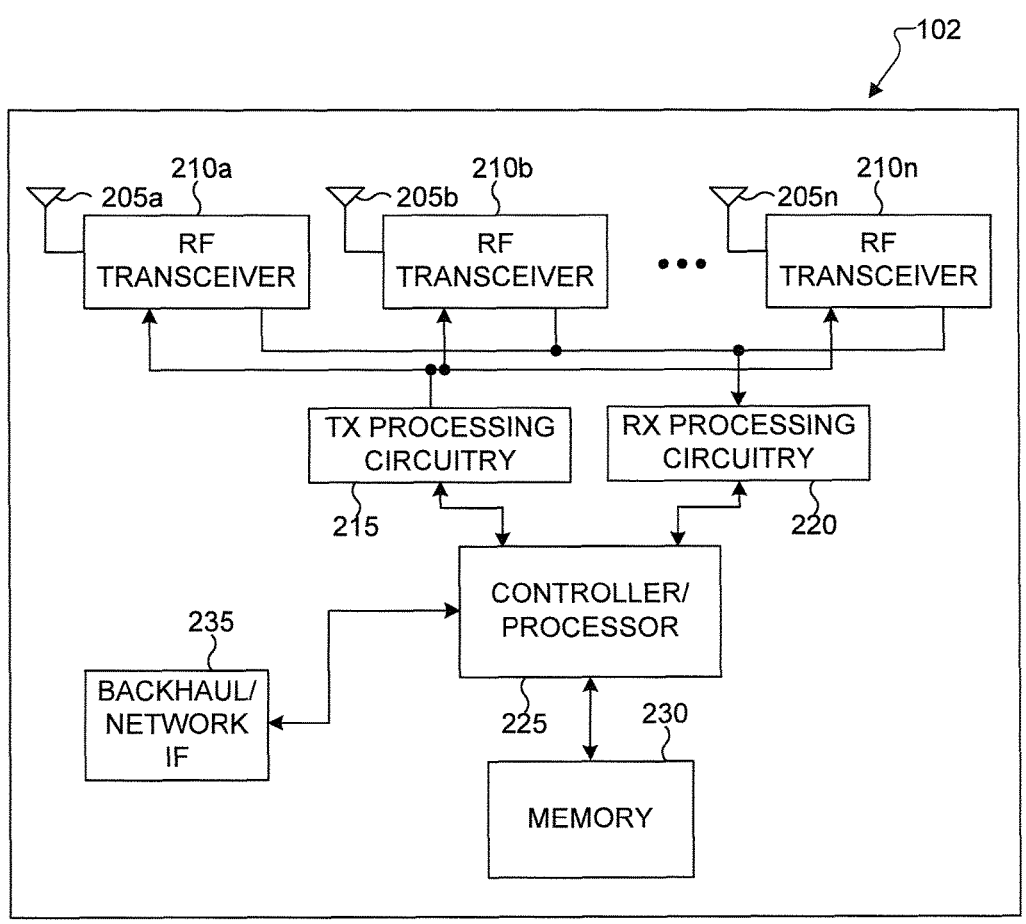
FIG. 2 illustrates an example e-NodeB (eNB) according to embodiments of the present disclosure.
Figure 3:
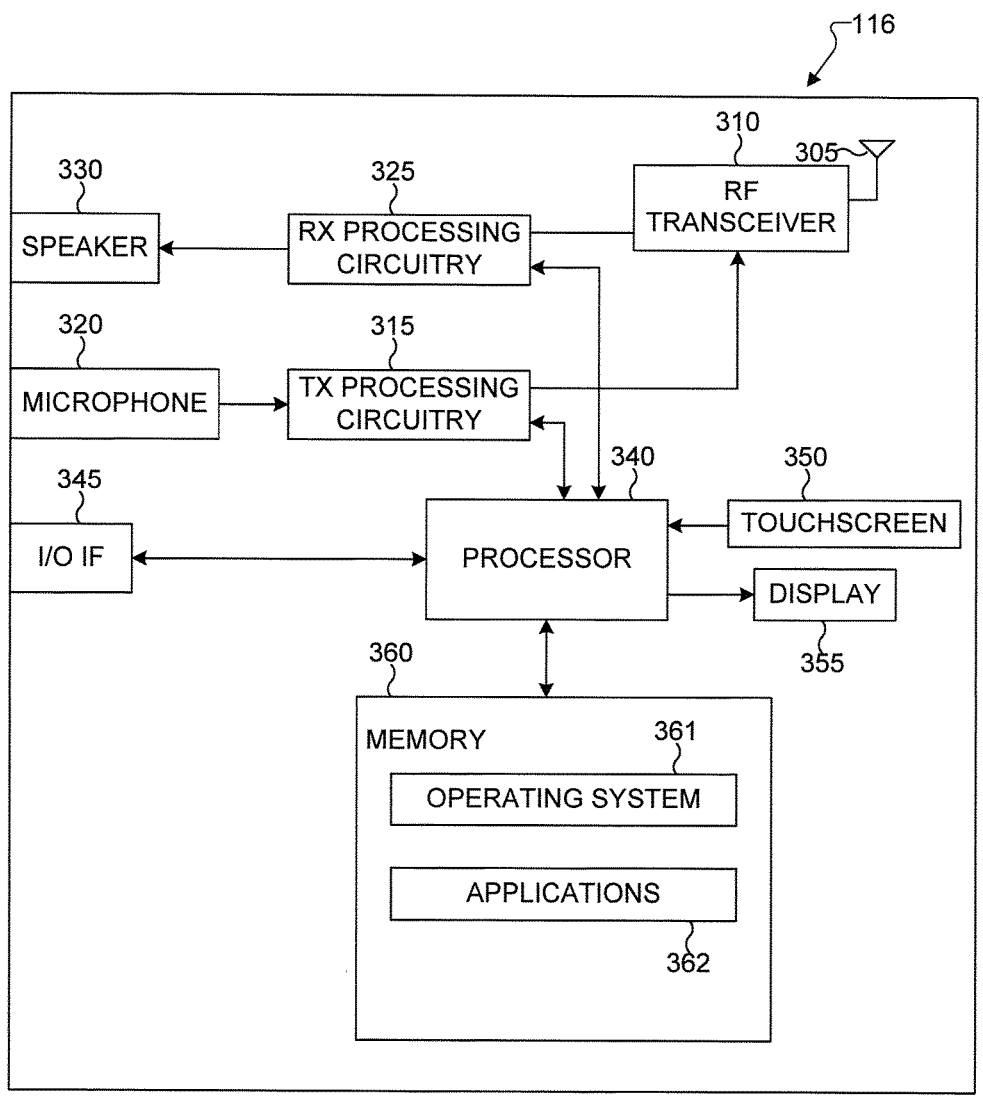
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known teens may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for vector quantization of feedback components such as channel coefficients. In certain embodiments, and one or more of the eNBs 101-103 includes circuitry, programming, or a combination thereof, for processing of vector quantized feedback components such as channel coefficients.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205*a*-205*n*, multiple RF transceivers 210*a*-210*n*, transmit (TX) processing circuitry 215, and receive (RX) processing circuitry 220. The eNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 includes circuitry, programming, or a combination thereof for processing of vector quantized feedback components such as channel coefficients. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330

(such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for vector quantization of feedback components such as channel coefficients. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
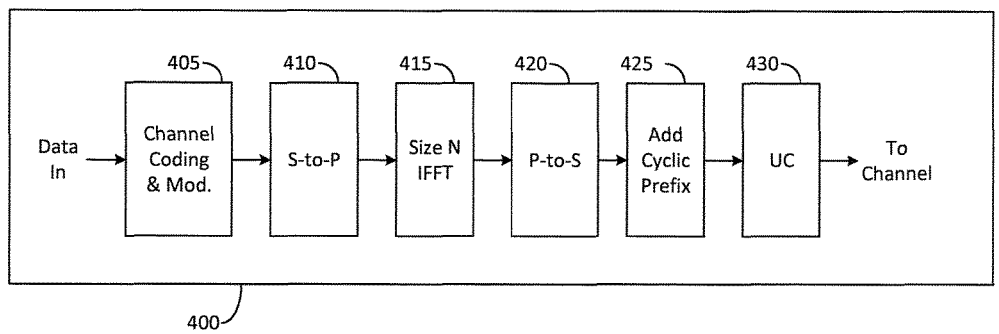
FIG. 4A illustrates a high-level diagram of an orthogonal frequency division multiple access transmit path according to embodiments of the present disclosure.
Figure 4B:
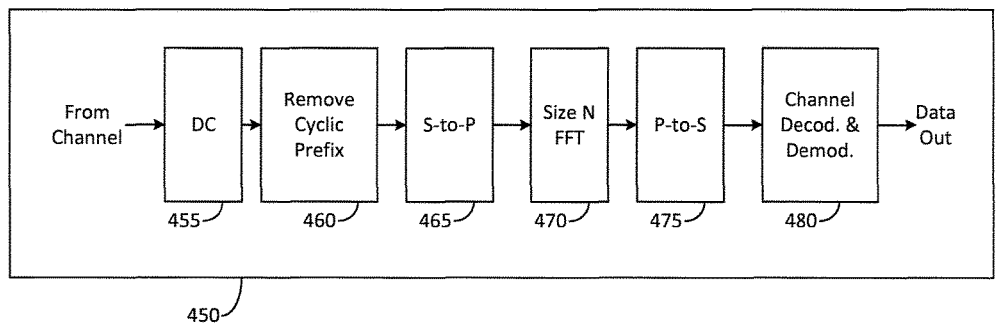
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 can be implemented in a base station (eNB) 102 or a relay station, and the receive path circuitry 450 may be implemented in a user equipment (e.g. user equipment 116 of FIG. 1). In other examples, for uplink communication, the receive path circuitry 450 can be implemented in a base station (e.g. eNB 102 of FIG. 1) or a relay station, and the transmit path circuitry 400 can be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback framework and structure for LTE enhancements when FD-MIMO with large two-dimensional antenna arrays is supported. To achieve high performance, more accurate CSI in terms MIMO channel is needed at the eNB 103 especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basis functions and vectors may be achieved. In another example, updated channel feedback parameters (e.g., the channel angular spreads) may be obtained at low mobility using UE-specific higher-layer signaling. In addition, a CSI feedback may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB 103. The present disclosure also includes a DL transmission method wherein an eNB 103 transmits data to a UE 116 over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
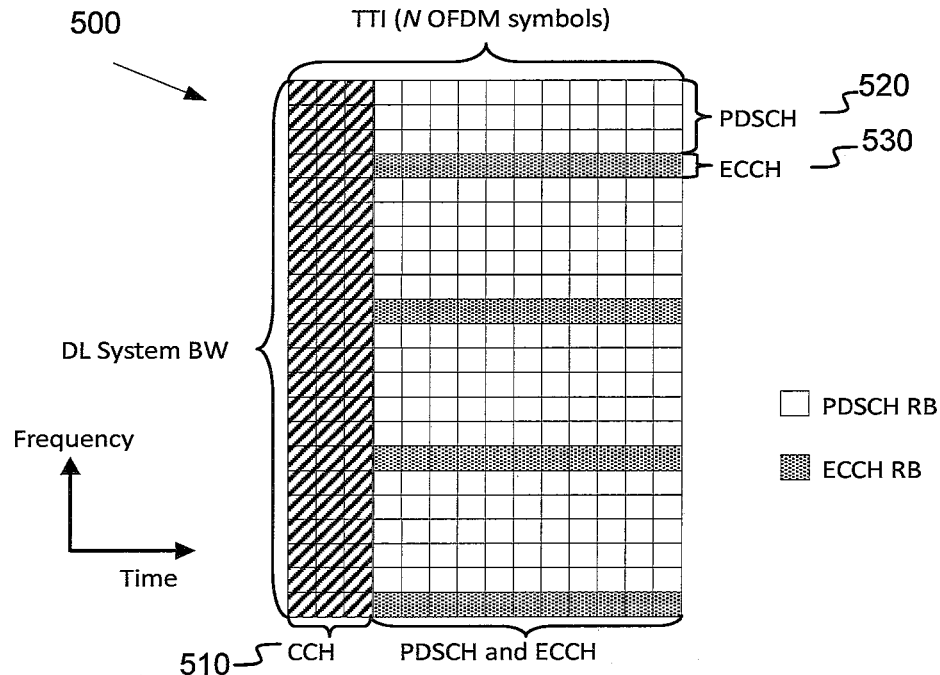
FIG. 5 illustrates an example structure for a downlink (DL) transmission time interval (TTI) according to embodiments of the present disclosure.

FIG. 5 illustrates an example structure for a downlink (DL) transmission time interval (TTI) 500 according to embodiments of the present disclosure. An embodiment of the DL TTI structure 500 shown in FIG. 5 is for illustration only. Other embodiments can be used without departing from the scope of the present disclosure.

As illustrated in FIG. 5, a DL signaling uses orthogonal frequency division multiplexing (OFDM) and a DL TTI includes N=14 OFDM symbols in the time domain and K resource blocks (RBs) in the frequency domain. A first type of control channels (CCHs) is transmitted in a first $N_1$ OFDM symbols 510 including no transmission, $N_1=0$. Remaining $N-N_1$ OFDM symbols are primarily used for transmitting PDSCHs 520 and, in some RBs of a TTI, for transmitting a second type of CCHs (ECCHs) 530.

An eNB 103 also transmits primary synchronization signals (PSS) and secondary synchronization signals (SSS), so that UE 116 synchronizes with the eNB 103 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

Figure 6:
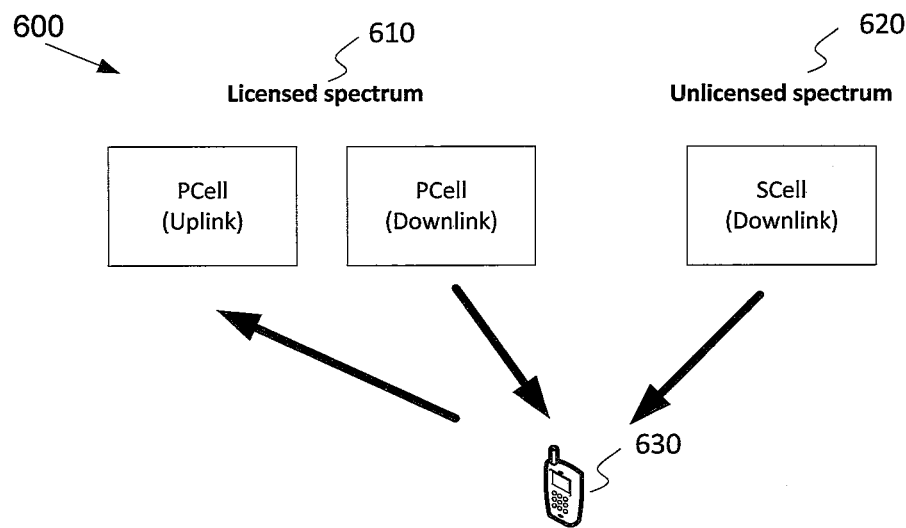
FIG. 6 illustrates an example carrier aggregation for a licensed spectrum and an unlicensed spectrum according to embodiments of the present disclosure.

FIG. 6 illustrates an example carrier aggregation for a licensed spectrum and an unlicensed spectrum 600 according to embodiments of the present disclosure. An embodiment of the carrier aggregation structure 600 shown in FIG. 6 is for illustration only. Other embodiments may be used without departing from the scope of the present disclosure.

An LTE radio access technology (RAT) may be deployed on an unlicensed frequency spectrum (LTE-U). In this situation, an LTE-U carrier may be deployed as a part of carrier aggregation schemes, wherein the LTE-U carrier is aggregated with another carrier on a licensed spectrum as illustrated in FIG. 6. In a conventional arrangement, carriers on the licensed spectrum 610 are assigned as a primary cell (PCell) and carriers on the unlicensed spectrum 620 are assigned as a secondary cell (SCell) for a UE 630.

Since there may be other RATs operating on the same unlicensed spectrum 620 as the LTE-U carrier, there is a need to enable co-existence of other RAT with LTE-U on an unlicensed frequency spectrum 620. In one embodiment, a TDM transmission pattern between a LTE-U transmitter and transmitters of other RATs such as a WiFi access point (AP) is implemented.

Figure 7:
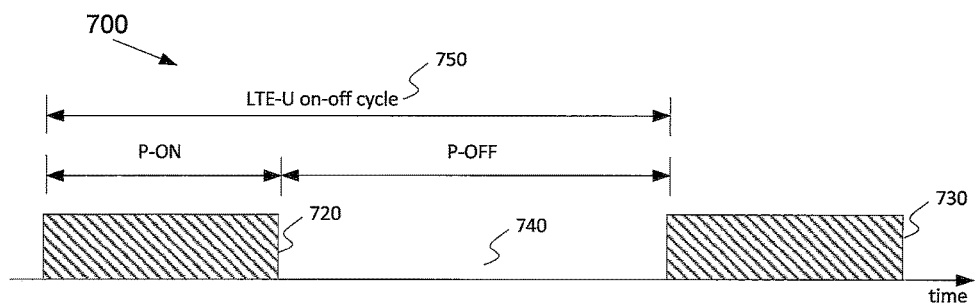
FIG. 7 illustrates an example time division multiplexing (TDM) transmission pattern for a long-term evolution-unlicensed (LTE-U) downlink carrier according to embodiments of the present disclosure.

FIG. 7 illustrates an example time division multiplexing (TDM) transmission pattern for a long-term evolution-unlicensed (LTE-U) downlink carrier 700 according to embodiments of the present disclosure. An embodiment of the TTM transmission pattern 700 shown in FIG. 7 is for illustration only. Other embodiments may be used without departing from the scope of the present disclosure.

As illustrated in FIG. 7, an LTE-U carrier is activated (such as ON) for a period P-ON 720, 730. In contrast, the LTE-U carrier is not activated (such as OFF) for a period P-OFF 740. When the LTE-U carrier is activate for ON duration 720, 730, LTE signals are transmitted, including at least one of a primary synchronization signal (PSS), a secondary synchronization signal (SSS), a common reference signal (CRS), a demodulation reference signal (DMRS), a physical downlink shared channel (PDSCH), a physical downlink control channel (PDCCH), an enhanced physical downlink control channel (EPDCCH) and a channel state indication-reference signal (CSI-RS).

When the LTE-U carrier is not activated for OFF duration, it does not transmit any signals, with a possible exception of a discovery reference signal with relatively long transmission periodicity. However, for simplicity it is assumed hereafter that nothing is transmitted by the LTE-U cell if it is OFF. An LTE-U on-off cycle is defined to be P-ON+P-OFF durations. The duration of the LTE-U on-off cycle is fixed or semi-statically configured. The duration of on-off cycle is of 100s of milliseconds. A length for the P-ON is either adjusted or adapted by a scheduler of the LTE-U according to a buffer status or a traffic pattern at the LTE-U carrier, and a co-existence metric requirement or target. WiFi APs or other RAT transmitters utilize the P-OFF period for transmissions since it is completely insulated from LTE-U interference. A measurement for the co-existence metric requirement is performed by the LTE-U cell during the P-OFF period of the LTE-U carrier to estimate a radio activity level of the spectrum being used for LTE-U transmissions. An adaptation of the P-ON and the P-OFF is performed per on-off cycle or per multiple on-off cycles. Signaling of the P-ON or the P-OFF of LTE-U cell to a UE 630 is performed using a SCell MAC activation and deactivation command. The SCell MAC activation command is sent through another serving cell such as a PCell. The SCell MAC deactivation command is sent from any serving cells, including the LTE-U cell. When the SCell is deactivated, the UE 630 does not receive data on the SCell.

If there are multiple LTE-U carriers on the same frequency, there is benefit in terms of throughput performance of WiFi and other RATs when the LTE-U carrier timings are synchronized (such as system radio frame numbers or radio frames or subframes of LTE-U carriers are synchronized).

Figure 8:
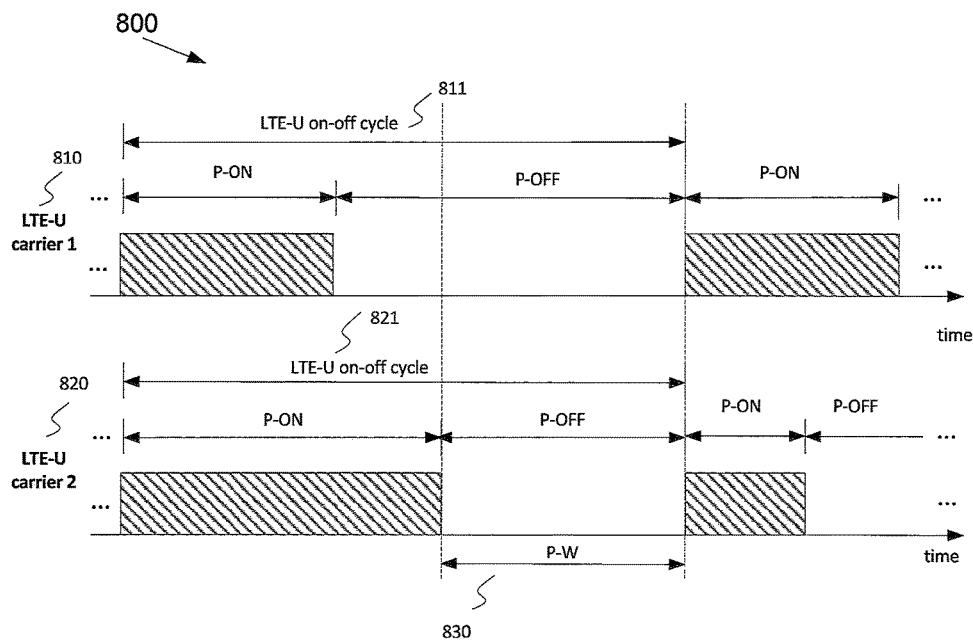
FIG. 8 illustrates an example TDM transmission pattern for two synchronized LTE-U downlink carriers according to embodiments of the present disclosure.

FIG. 8 illustrates an example time division multiplexing (TDM) transmission pattern for two synchronized LTE-U downlink carriers 800 according to embodiments of the present disclosure. An embodiment of the TDM transmission pattern 800 shown in FIG. 8 is for illustration only. Other embodiments may be used without departing from the scope of the present disclosure.

As illustrated in FIG. 8, there are two LTE-U carriers on the same carrier frequency 810 (such as LTE-U carrier 1) and 820 (such as LTE-U carrier 2). The first LTE-U carrier's on-off cycle 811 is synchronized with the second LTE-U carrier's on-off cycle 821. WiFi and other RATs operate without interference from LTE-U carriers in time period P-W 830.

Figure 9:
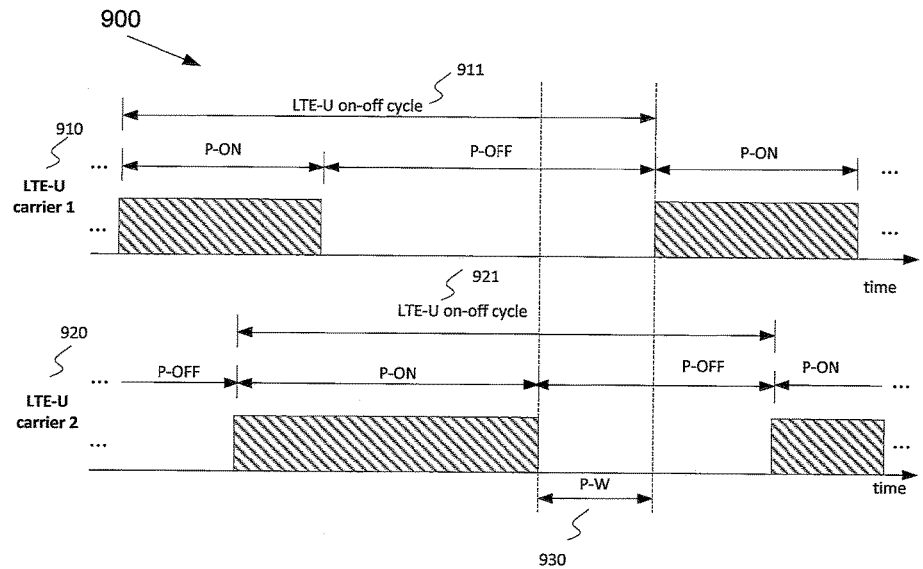
FIG. 9 illustrates an example TDM transmission pattern for two asynchronized LTE-U downlink carriers according to embodiments of the present disclosure.

FIG. 9 illustrates an example TDM transmission pattern for two asynchronized LTE-U downlink carriers 900 according to embodiments of the present disclosure. An embodiment of the TDM transmission pattern 900 shown in FIG. 9 is for illustration only. Other embodiments may be used without departing from the scope of the present disclosure.

As illustrated in FIG. 9, there are two LTE-U carriers on the same carrier frequency 910 and 920 (such as LTE-U carrier 1 and LTE-U carrier 2). A timing of the two LTE-U carriers 910, 920 are not synchronized. In addition, a time period P-W 930 that is completely insulated from LTE-U interference is significantly reduced comparing to the case that the LTE-U carriers are synchronized. Alternatively, since different LTE-U carriers are controlled by different eNBs (such as access point (AP)) that belong to different operators, there is a need to design procedures to achieve efficient LTE-U operation on either an unlicensed spectrum or a shared spectrum. In addition, there is a need to support a co-existence of LTE-U cells with the same or different operators as well as with transmission from other radio access technologies (such as WiFi).

Figure 10:
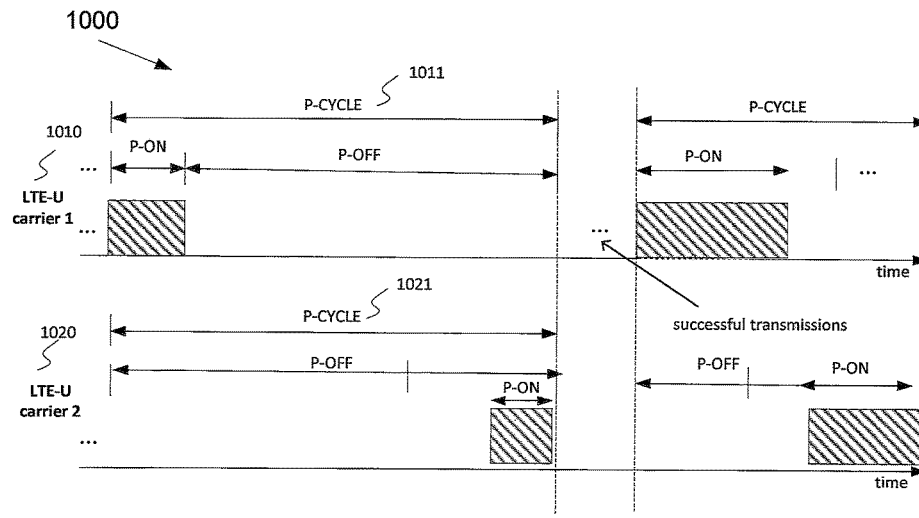
FIG. 10 illustrates an example configuration for an LTE-U period-on (P-ON) duration selection between LTE-U cells according to embodiments of the present disclosure.

FIG. 10 illustrates an example configuration for an LTE-U period-on (P-ON) duration selection between LTE-U cells 1000 according to embodiments of the present disclosure. An embodiment of the LTE-U P-ON duration selection configuration 1000 shown in FIG. 10 is for illustration only. Other embodiments may be used without departing from the scope of the present disclosure.

As illustrated in FIG. 10, a LTE-U cell 1 1010 utilizes a P-ON duration starting from the start of P-CYCLE 1011, while LTE-U cell 2 1020 utilizes a P-ON duration starting from the start of P-CYCLE 1021. This is beneficial if the first LTE-U cell 1010 and the second LTE-U cell 1020 are synchronized beforehand at a single frequency network (SFN), a radio frame or a subframe level.

In certain embodiments, an LTE-U on-off cycle duration (such as P-CYCLE) is configured by an eNB 103 (such as AP) and coordinated (such as over X2 interface) among eNBs (APs) controlling LTE-U carriers. A start instance of the on-off cycle is marked by downlink transmission in either one or multiple subframes immediately after an off period. In one embodiment, an eNB 103 always schedules a transmission of downlink data from a start instance of an on-off cycle. In another embodiment, the eNB 103 always transmits a preamble signal (such as DRS) in either one or more subframes at a start instance of an on-off cycle. In such embodiments, an optimal P-CYCLE is configured by multiple factors such as a traffic density (such as number of neighbor nodes), a traffic type (such as bursty video, file transfer protocol (FTP), control traffic), an RAT type (such as LTE-U or WiFi), a coordination level (such as intra-coordination versus inter-coordination), a received signal strength (such as RSSI or RSRP), a coexistence mechanism (such as LBT or non-LBT), and a number of available LTE-U carrier frequencies or channels.

In certain embodiments, the presence of a second LTE-U cell or more cells within the eNB 103 coverage operating on the same frequency is detected when a first LTE-U cell operates on a given frequency. In addition, the eNB 103 can detect the presence of one or more nodes utilizing a different RAT (such as WiFi) operating on the same frequency. Furthermore, in order to provide a coexistence with neighboring nodes, the first LTE-U cell determines a P-CYCLE that accommodates transmissions of the other cells over a given period of time (such as one or more P-CYCLE durations).

In certain embodiments, a first LTE-U cell selects a P-CYCLE P-ON duration based on, or as a function of, an iterative algorithm that increases a number of transmission slots in a P-ON duration after a given time duration, where a transmission slot corresponds to one or LTE symbols, subframes, frames, or other (pre)configured granularities. The duration between increasing the P-ON durations is determined by one or more factors, including the number of transmissions where the LTE-U cell has successfully acquired the channel without requiring backoff due to listen-before-talk (LBT) requirements which utilize physical or virtual carrier sensing to detect the presence of one or more LTE-U or WiFi transmissions for example. In one example, the P-ON duration determination is performed based on the number of detected LTE or WiFi transmissions during the P-OFF duration. In another example, the P-ON duration determination is performed based on the number of empty slots (such as subframes) detected during the P-OFF duration.

In one embodiment, the following procedure is utilized to determine an optimal value of the P-ON. At step 1, an LTE-U cell selects an initial maximum P-ON duration N based on a (pre)configured default value or other methods. At step 2, after c successful LTE-U transmissions, the maximum P-ON duration is set to N' where N'=2$^c$−1. At step 3, the first LTE-U cell transmits data for the maximum P-ON duration and indicates the value of N' to UEs and other LTE-U cells using either a physical layer signaling or a higher layer signaling.

In another embodiment, the following procedure is utilized to determine an optimal value of P-ON. At step 1, an LTE-U cell selects an initial maximum P-ON duration N based on a (pre)configured default value or other method. At step 2, after c successful LTE-U transmissions, the maximum P-ON duration is set to N' where N'=c+1. At step 3, the first LTE-U cell transmits according to the P-ON duration and indicates the value of N' to receiving UEs and other LTE-U cells using physical layer or higher layer signaling.

In yet another embodiment, the following procedure is utilized to determine the value of P-ON. At step 1, an LTE-U cell selects an initial maximum P-ON duration N based on, or as a function of, a (pre)configured default value or other method. At step 2, after c successful LTE-U transmissions, the maximum P-ON duration is set to N' where N'=2c. At step 3, the first LTE-U cell transmits according to the P-ON duration and indicates the value of N' to receiving UEs and other LTE-U cells using physical layer or higher layer signaling.

In yet another embodiment, the following procedure is utilized to determine the value of P-ON. At step 1, an LTE-U cell selects an initial maximum P-ON duration N based on a (pre)configured default value or other method. At step 2, after c successful LTE-U transmissions, the maximum P-ON duration is set to N' where N'=floor(log(c+1)). At step 3, the first LTE-U cell transmits according to the P-ON duration and indicates the value of N' to receiving UEs and other LTE-U cells using physical layer or higher layer signaling. In such embodiments, an ON-duration N and a variance parameter c are equivalent or take different values and tuned independently or in a correlated manner.

If multiple LTE-U cells are coexisting and coordinating the P-CYCLE duration, the P-ON duration is increased based on orthogonal time/frequency resources (such as from the start instance and end instance of a LTE-U period) as shown in FIG. 10.

Although two cells are illustrated as example, this embodiment is extended in a straightforward manner to cases where there are more than two LTE-U cells. In addition although only one frequency channel is illustrated, such embodiments according to the present disclosure are extended to a frequency channel selection or a joint time/frequency P-ON selection for an LTE-U cell. In this case FIG. 10 corresponds to multiple LTE-U carriers utilized by the same eNB (such as AP), wherein the determination of which carrier to utilize and the subsequent P-ON duration are determined by an adaptation algorithm. For example a cell has an ability to access four LTE-U carrier frequencies. The growth algorithm is applied to starting on a pre-configured primary frequency and expanding to additional three frequencies according to the previously described embodiments according to the present disclosure. A primary frequency and additional secondary frequencies are additionally determined based upon multiple factors indicated for selecting P-ON such as a received signal strength, an RAT, a coexistence mechanism, or traffic density.

In certain embodiments, a first LTE-U cell selects a P-CYCLE P-ON duration based on, or as a function of, an iterative algorithm that decreases a number of transmission slots in the P-ON duration after a given time duration, wherein the transmission slot corresponds to one or more LTE symbols, subframes, frames, or other (pre)configured granularities. In such embodiment, a decreasing time duration between the P-ON durations is determined by one or more factors, including the number of transmissions wherein the LTE-U cell has successfully acquired the channel without requiring a backoff operation due to LBT requirements that utilize a physical or a virtual carrier sensing to detect the presence of one or more LTE-U or WiFi transmissions.

In one embodiment, a time duration between the decreasing P-ON durations is determined based on a number of successful WiFi transmissions or other LTE-U cells transmissions. In such embodiment, the following procedure is utilized to determine an optimal value of the P-ON. At step 1, an LTE-U cell selects an initial maximum P-ON duration N based on a (pre)configured default value or other methods. At step 2, after c unsuccessful LTE-U transmissions or c successful transmissions from another node, the maximum P-ON duration is set to N' where N'=N−(2$^c$−1). At step 3, the first LTE-U cell transmits data according to the P-ON duration and indicates the value of N' to UEs and other LTE-U cells using either a physical layer signaling or a higher layer signaling. If multiple LTE-U cells are coexisting and coordinating the P-CYCLE duration, the P-ON duration is increased based on orthogonal time/frequency resources (such as from the start instance and end instance of a LTE-U period). In such embodiments, the different LTE-U cells use either the exponential growth method or the exponential decreasing method. In certain embodiments, a decremental scheme (such as linear, geometric, or sub-linear decremental scheme) is applied. In certain embodiments, a decremental scheme is the inverse of an incremental scheme by applying to formula N"=N−N', where N is the current P-ON duration, N' is the P-ON duration determined by the incremental scheme, an N" is the duration applied by the decremental scheme after replacing the parameter c from number of successful transmissions with the number of unsuccessful transmissions (or successful WiFi transmissions).

Figure 11:
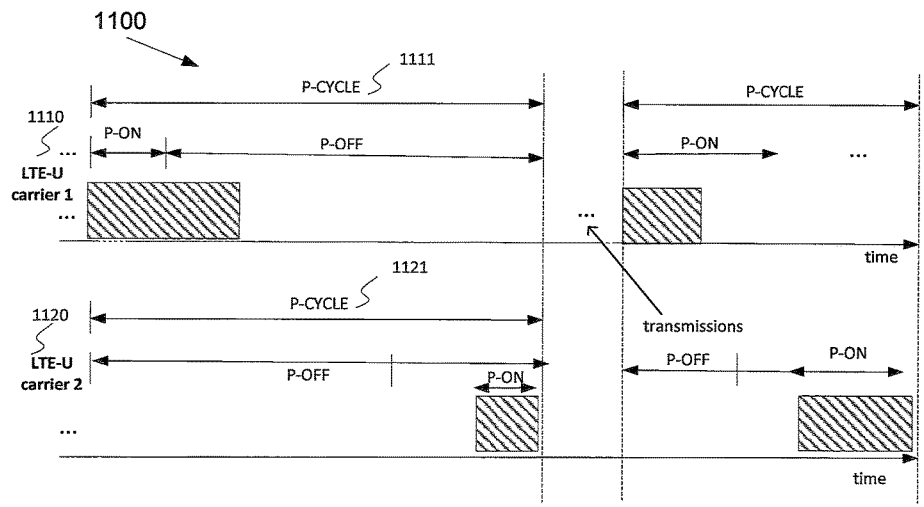
FIG. 11 illustrates another example configuration for an LTE-U P-ON duration selection between LTE-U cells according to embodiments of the present disclosure.

FIG. 11 illustrates another example configuration for an LTE-U P-ON duration selection between LTE-U cells 1100 according to embodiments of the present disclosure. An embodiment of the LTE-U P-ON configuration 1100 shown in FIG. 11 is for illustration only. Other embodiments may be used without departing from the scope of the present disclosure.

As illustrated in FIG. 11, an LTE-U cell 1 1110 utilizes a P-ON duration starting from the start of P-CYCLE 1111, while an LTE-U cell 2 1120 utilizes a P-ON duration starting from the start of P-CYCLE 1121. This is beneficial that if the first LTE-U cell 1110 and the second LTE-U cell 1120 are synchronized beforehand at an SFN, a radio frame or a subframe level. Although two cells are illustrated as example, this embodiment is extended in a straightforward manner to cases where there are more than two LTE-U cells. One benefit according to embodiments of the present disclosure is that the period between P-ON for LTE-U cells is effectively increased to provide fairness and coexistence between multiple operators/systems (such as WiFi or other RAT traffic increases).

In certain embodiments, an LTE-U transmitter selects an LTE-U time slot of a period in a deterministic or a random manner. For example the LTE-U transmitter always selects a first slot of the period or selects one of the N slots with a uniformly random probability to reduce a chance of hidden node starvation due to overlapping transmissions. In order to coordinate the transmissions of LTE-U slots, one or more parameters associated with a selection of P-ON duration is exchanged between eNBs and/or signaled to UEs through a higher-layer signaling. In such embodiment, a maximum P-ON duration (N), a transmission variance parameter (c), thresholds or other variables used to tune N (N', or c), a timing of P-CYCLE, P-SLOT durations, and a combination thereof. For example, if multiple eNBs are transmitting and coordinating operation, they exchange the above parameters to maximize an amount of total P-OFF duration that is available to other non-cooperating nodes. Other methods of triggering the P-ON duration may also be utilized.

In certain embodiments, the P-ON duration is increased in a proportional manner to an amount of data in a buffer of the LTE-U eNB 103 or UE 630 and/or the required data rate to meet a QoS level for a given data transmission flow. For example the LTE-U cell serving a best-effort low data rate traffic flow selects P-ON parameters that increase the P-ON duration at a slower rate when the LTE-U cell was serving a traffic flow that had a guaranteed QoS (such as streaming video). This parameter selection based on traffic mapping allows for a network (such as eNB) to balance tradeoffs between the increased coexistence and the reduced interference according to a spectral efficiency of the LTE-U transmissions on an unlicensed spectrum. In one example, such parameters for traffic rate/QoS mapping are predefined or configured by a network (such as eNB) using an inter-node and/or a higher layer signaling. Table 1 shows an example parameters mapping that is utilized to determine a P-ON duration.

TABLE 1

| QoS Level | P-ON Parameter Set |
|---|---|
| 0—VoIP | N = 5, c = 1 |
| 1—Data | N = 5, c = 2 |
| 2—Video | N = 10, c = 2 |
| 3—HD Video | N = 10, c = 4 |

A determination procedure to apply a cycle alignment, orthogonality, or a randomization based on the aforementioned embodiments is indicated by measurements of the activity and type of neighboring cells. In one example, an energy detection, an LTE cell detection, and/or a WiFi carrier detection method are employed for a cycle selection method by a network (such as eNBs, base stations, AP) and connected UEs configured for reporting to determine the cycle selection method.

A P-ON duration is extended or applied across one or more LTE-U carriers. In one example, an LTE-U node determines a relative traffic density across multiple LTE-U carriers and selects P-ON durations in such a way to shape the traffic density differently on these multiple carriers. Alternatively, the LTE-U carrier is able to simultaneously utilize multiple LTE-U carriers, but selects different P-ON durations in order to ensure different levels of coexistence opportunities with other nodes. This operation provides a simultaneous transmission across both carriers as well as periods of transmissions that are not aligned across a bandwidth. In one embodiment, if two nodes are capable of utilizing two carriers that result in both nodes performing a collision backoff, operation, a LTE-U cell transmits data on one channel to cause the other node to switch to a single channel mode as well on a different carrier that prevents backoff operation of both nodes.

In one embodiment, an LTE-U opportunistically switches carriers depending on a current level of traffic density on multiple carriers. P-ON parameters are then applied to both in time NT (such as ct) and frequency NF (such as nf) or jointly optimized across time/frequency slots. In another embodiment, different P-ON adaptation parameters are configured and utilized based on a transmission (such as control transmission, data transmission) or measurements during the P-ON period. For example, when a UE 630 measures a channel for RRM/CSI feedback, some periods utilize a different periodic transmission pattern with a fixed number of slots while transmitting data during the P-ON periods where exponential growth and decrease parameters are configured and signaled to the UE 630.

The set of parameters to be utilized are fixed or (pre) configured by a higher layer signaling. The application depends on a system information indication or an implicit/explicit determination of an LTE-U frame structure (such as preamble or DCI decoding) for a given P-ON or P-CYCLE duration. Although downlink transmission situation are illustrated as examples, these embodiments are extended to uplink transmissions as well using the same or a different set of parameters.

When a first LTE-U cell proceeds to detect a start instance of an on-off cycle of a second or more neighboring LTE-U cells the second LTE-U cell or more neighboring LTE-U cell are not detected if the first LTE-U cell is out of a transmission range from the second LTE-U cell or more neighboring LTE-U cells but UEs served by the first LTE-U cell are within the transmission range of the second LTE-U cell or more neighboring LTE-U cells. In this situation (such as hidden node problem), undesired inefficient operations could occur due to cycle misalignment. In particular, a WiFi AP that is located within an overlapping coverage region of both the first LTE-U cell and the second LTE-U (or more neighboring LTE-U cells) could be deprived of channel access.

Figure 12:
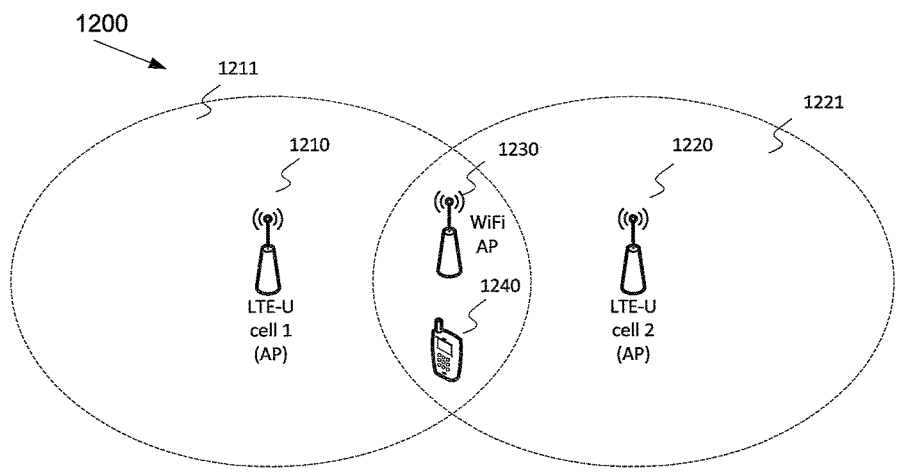
FIG. 12 illustrates an example configuration for hidden and exposed nodes problem according to embodiments of the present disclosure.

FIG. 12 illustrates an example configuration for hidden and exposed nodes problem 1200 according to embodiments of the present disclosure. An embodiment of the hidden and exposed nodes problem configuration 1200 shown in FIG. 12 is for illustration only. Other embodiments may be used without departing from the scope of the present disclosure.

As illustrated in FIG. 12, a first LTE-U cell 1210 has transmission coverage 1211 and a second LTE-U cell 1220 has transmission coverage 1221. Each LTE-U cell 1210, 1220 is out of coverage of the other LTE-U cell but a WiFi AP 1230 and a UE 1240 are located in overlapping coverage areas of both LTE-U cells 1210, 1220.

A hidden node problem as illustrated in FIG. 12 is solved by message exchanges such as a request to send (RTS)/clear to send (CTS) message that informs a transmitter as well as potential interfering nodes about their presence mutually. If the RTS/CTS is utilized, a potential transmitter (such as eNB 103/UE 1240) receives the RTS message from another transmitting node while not hearing subsequently transmitted CTS message from the eNB 103/UE 1240, and then the potential transmitter knows there is an 'exposed node' in a communication network. In this case, the eNB 103/UE 1240 still transmits and tries to avoid backoff operation to improve a spectral efficiency of the system.

In one embodiment, a combination of DL/UL signals is utilized for exchanging of RTS/CTS indications as well as for measurement purposes or a power control adaptation. The signals are explicitly used as a part of a channel reservation exchange procedure or implicitly used by the network to achieve transmission request and availability knowledge on an unlicensed carrier across multiple serving and interfering cells/nodes.

These signals are sent exclusively on a licensed carrier, an unlicensed carrier, or a combination thereof. For example, a downlink control message (DCI) followed by an acknowledgement message (ACK) is utilized as an RTS/CTS exchange without explicit fields indicating this purpose. Additionally the DCI and the ACK messages, or new LTE-RTS LTE-CTS messages are modified with one or more additional fields to indicate one or more explicit relevant such as a request to transmit, a transmission ID, a duration (such as Cycle, if utilized), a clear to transmit, a receiver ID, a channel measurement, and a transmission power control.

An LTE-U node serves multiple UEs/eNBs participating in a distributed channel reservation protocol. In this case, although multiple nodes attempt to access a channel (such as measuring the channel) in order to determine whether the channel is available, every node/UE does not need to transmit RTS/CTS. For example if an LTE-U cell serves 5 UEs and sends an RTS, two UEs located in different geographical region transmit a CTS but two UEs at roughly the same geographical location does not need to send such a CTS. In this situation, an eNB 103 transmits a signaling message that instructs a UE 1240 to send an RTS or CTS. Such a triggering mechanism is achieved based on a physical or a higher layer signaling. Additionally, the determination of sending an RTS/CTS depend on meeting certain criteria or a certain UE state such as a current packet size, a priority, and a measurement.

The LTE-U carrier frame structure differs from a frame structure on the licensed carrier in order to accommodate a coexistence mechanism such as RTS/CTS subframes or slots.

In one embodiment, duplex agnostic subframes are used that allow a UE 1240 or an eNB 103 to transmit data according to the traffic availability or to provide scheduling/control messages (such as DCI), feedback messages (such as ACK/NACK), synchronization/measurements message (such as DRS/CSI-RS/CSI Feedback), or RTS/CTS message exchanges.

In another embodiment, a frame structure includes a mix of contention and non-contention based subframes. For example a pattern of the subframes are configured for an ON duration (such as one frame) that indicates which subframes are utilized for a regular/periodic transmissions and data, and which subframes are subjected to contention for the purposes aforementioned. A priority of utilization of these subframes comprises a higher or a lower priority according to whether they are reserved or not and the purpose of transmissions. For example, high priority transmissions (such as a synchronization, a control message transmission, and a CSI measurements/feedback) are prioritized on contention-free subframes over best-effort traffic transmissions that only utilizes contention-enabled subframes, or contention-free subframes on a secondary basis to the higher priority transmissions.

Figure 13:
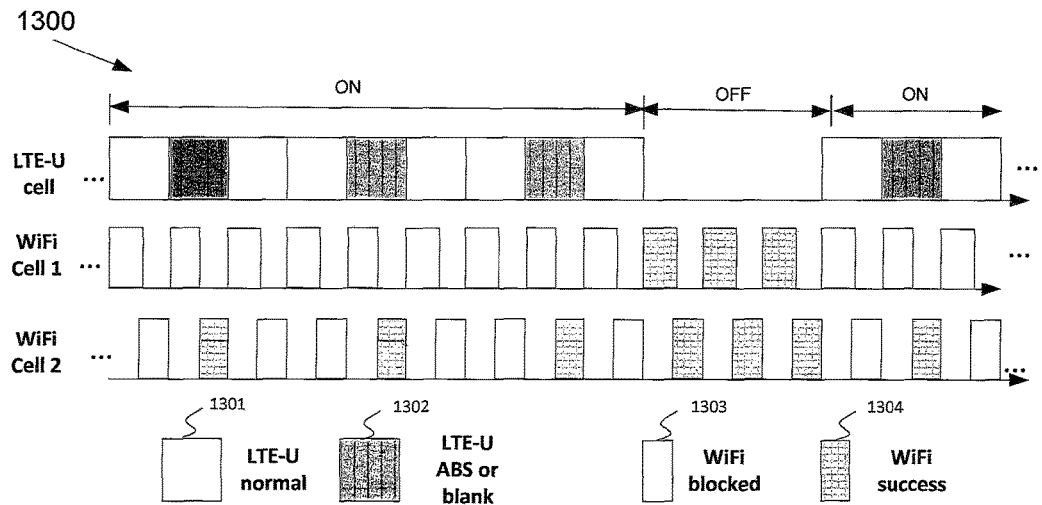
FIG. 13 illustrates an example configuration of an enhanced discontinuous transmission (DRX) for an LTE-U cell according to embodiments of the present disclosure.

In yet another embodiment, an eNB 103 utilizes a subframe type to avoid act/deact overhead of CSAT by utilizing blank or almost blank subframes (ABS), subframes with a reduced or lower transmission power, or subframes with a low RS overhead (such as multimedia broadcast multicast service single frequency network (MBSFN) or new carrier type (NCT)), in addition to normal LTE subframes. For example as illustrated in FIG. 13, the eNB 103 configures LTE-U low power ABS (LP-ABS) or blank subframes 1302 during a P-ON period along with LTE-U normal subframes 1301. A UE 1240 is signaled regarding the LTE-U LP-ABS or blank subframe 1302, or detects the subframe presence and type, maintains synchronization, and then performs measurements periodically during this period instead of turning of an Rx completely during this period. During idle periods created by the subframe pattern, other nodes such as WiFi nodes are either blocked by the LTE transmissions (e.g., WiFi blocked 13031 or allowed to transmit (e.g., WiFi success 13041 since LBT/coexistence protocols are not triggered due to a low power transmission in those subframes. This increases the number of transmission opportunities for other nodes within the transmission range of eNB in addition to transmissions made during the P-OFF period.

In such example, a subframe pattern (such as data puncturing bitmap or puncturing pattern), a pattern period/duration, and a transmission power of one or more signals are indicated. In addition whether or not a subframe or puncturing pattern is applied is configurable by a network (or eNB). In one example of a subframe pattern, a periodic MBSFN/ABS pattern is configured using existing RRC signaling that is not correspond to the same periodicity as the configured P-ON duration of the P-CYCLE used by the eNB.

In this case, the determination at the eNB of whether a subframe is transmitted and which subframe type is utilized is based upon the intersection of the configured subframe pattern with the P-ON duration. In another example of a subframe pattern, a puncturing pattern bitmap is configured that has a length corresponding to the P-ON duration. This pattern is configured instead of or in addition to another subframe pattern such as a MBSFN/ABS pattern. The puncturing pattern bitmap indicates whether a subframe is not transmitted if the value corresponding to the subframe index is set to '1' and is transmitted if the value is set to '0.' When the P-ON duration or subframe pattern is updated, the determination of subframe transmission or type is additionally updated. The eNB 103 also tunes the transmission power in the ABS subframes to not trigger WiFi backoff (such as to ensure RSSI<−82 dBm). Measurements of transmissions of other nodes are performed by a network (such as eNB) or relayed by connected UEs to determine an appropriate coexistence subframe pattern and/or transmission power.

FIG. 13 illustrates an example configuration of an enhanced discontinuous transmission (DRX) 1300 for an LTE-U cell according to embodiments of the present disclosure. An embodiment of the enhanced DRX 1300 shown in FIG. 13 is for illustration only. Other embodiments may be used without departing from the scope of the present disclosure.

In certain embodiments, a DRX is configured for a UE 630 on a period of the LTE-U cell. The UE 630 that is configured with DRX only monitors a PDCCH and receives a PDSCH during the ON duration of a DRX cycle. In order to save power, the UE 630 turns off its receiver during the OFF period of the DRX cycle. The LTE-U cell also mutes its transmission during the OFF duration of the DRX cycle. However, an eNB 103 tries to align the DRX pattern across multiple cells including the licensed and unlicensed carriers to reduce complexity. In this case the UE 630 enters a DRX operation just as the eNB 103 potentially transmits data on the LTE-U carrier that is not received by the UE 630.

In another embodiment, an extended DRX ON period is utilized according to a transmission type during a P-ON period. For example if a UE 630 detects a transmission directed to the UE 630 from an eNB 103 other than itself during the P-ON period, the DRX extension is not applied. However the DRX extension is applied if scheduled data or measurement signals are present on an LTE-U carrier. The eNB 103 additionally signals whether or not the extended DRX cycle applies with a physical layer signaling. The extended DRX cycle is utilized additionally if feedback or acknowledgement signals (such as CSI feedback or ACK/NACK) have not yet been received by the UE 630 during the ON duration, but are expected to be received due to ongoing transmissions (such as HARQ timeline or periodic feedback configurations). Furthermore, the eNB 103 and the UE 630 exchange capability/configuration signaling about the request DRX parameters including the duration of the DRX ON extension and periodicity.

Figure 14:
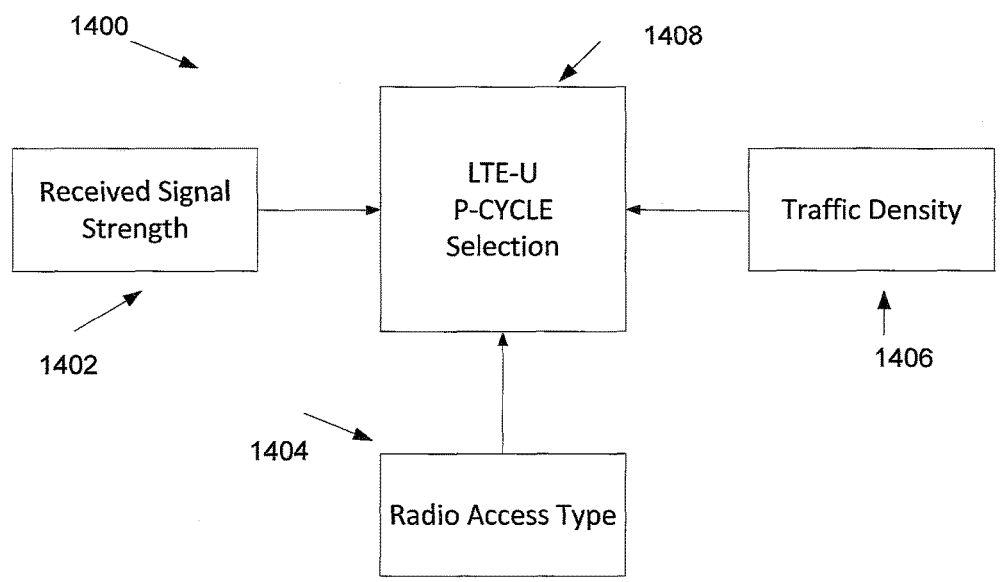
FIG. 14 illustrates an example procedure of a P-CYCLE selection according to embodiments of the present disclosure.

FIG. 14 illustrates an example procedure of a P-CYCLE selection 1400 according to embodiments of the present disclosure. An embodiment of the P-CYCLE selection 1400 shown in FIG. 14 is for illustration only. Other embodiments may be used without departing from the scope of the present disclosure. The P-CYCLE selection 1400 receives a signal strength 1402, a radio access type 1404, and a traffic density 1406. In one example, signal strength 1402 is determined by RSSI measurement(s) from one or more WiFi nodes, or RSRP measurement(s) of one or more LTE nodes. In another examples, radio access type 1404 is determined by detecting of one or more 802.11 preamble formats or LTE physical signals or channels. In yet another example, traffic density 1406 is determined based on a function incorporating one or more of the following parameters: a number of successful or unsuccessful transmissions reported from one or more UEs or detected by the eNB, detected transmission duration of other nodes by one or more UEs or at the eNB during one or more P-OFF periods, based upon energy detection during one or more P-OFF periods or one or more detected 802.11 preamble formats or LTE control signals. In accordance with a criteria based on the signal strength 1402, the radio access type 1404, and the traffic density 1406, the LTE-U P-CYCLE unit 1408 determines and generates an optimal P-CYCLE comprising a P-ON duration and a P-OFF duration on one or more LTE-U channel. In addition, different network-configurable weights are applied to one or more of the criteria used by the LTE-U P-CYCLE unit 1408. In one example of a network-configurable weight, radio access type (such as LTE or WiFi) is prioritized over signal strength or traffic density criteria. In this example of prioritization, if two nodes are detected with similar signal strength and traffic density, different P-CYCLE determination is performed if the nodes are of different radio access type (such as LTE or WiFi).

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What claimed is:

1. A method for efficient data transmissions in a wireless communication system, the method comprises:
dynamically configuring, by an access point (AP), at least one period cycle (P-CYCLE) pattern for a long term evolution in unlicensed spectrum (LTE-U) carrier comprising a period-on (P-ON) duration of the LTE-U carrier when the LTE-U carrier is activated having a first length and a period-off (P-OFF) duration of the LTE-U carrier when the LTE-U carrier is not activated having a second length, the first length and the second length dynamically adjusted based on a number of LTE-U transmissions in a shared band spectrum, wherein the number of LTE-U transmissions comprises a number of successful LTE-U transmissions or a number of unsuccessful LTE-U transmissions occurring during the P-ON duration;
counting the number of successful LTE-U transmissions on the LTE-U carrier received from user equipment (UEs) occurring during the P-ON duration after transmitting the P-CYCLE pattern including the P-ON duration and the P-OFF duration to the UEs operating with the AP;
updating the first length of the P-ON duration and the second length of the P-OFF duration included in the at least one P-CYCLE pattern of the LTE-U carrier based on the number of successful LTE-U transmissions occurring during the P-ON duration from the UEs operating with the AP;
transmitting the at least one P-CYCLE pattern including the updated first length of the P-ON duration and the updated second length of the P-OFF duration to at least one UE using a higher layer signaling or a physical layer signaling; and
receiving, from the at least one UE, data in at least one LTE-U transmission occurring during the P-ON duration of the at least one P-CYCLE pattern of the LTE-U carrier including the updated first length of the P-ON duration and the updated second length of the P-OFF duration.

2. The method of claim 1, wherein dynamically configuring the at least one P-CYCLE pattern of the LTE carrier comprises the first length of the P-ON duration and the second length of the P-OFF duration that are adjusted in accordance with a number of LTE-U transmissions in a shared band spectrum further comprises selecting an initial maximum P-ON duration in accordance with a pre-configured value.

3. The method of claim 2, wherein counting the number of successful LTE-U transmissions received from the UEs after transmitting the P-CYCLE pattern of the LTE carrier including the first length of the P-ON duration and the second length of the P-OFF duration to the UEs operating in the AP does not include a number of successful LTE-U re-transmissions from the UEs, the UEs performing a back-off operation based on listen-before-talk (LBT) requirements.

4. The method of claim 2, wherein the updating the first length of the P-ON duration included in the at least one P-CYCLE pattern of the LTE carrier in accordance with the number of successful LTE-U transmissions from the UEs operating in the AP comprises obtaining an updated first length of P-ON duration in accordance with the following equation:

$$\text{updated P-ON duration} = 2c(\text{initial P-ON duration})$$

where c is the number of successful LTE-U transmissions from the UEs operating in the AP.

5. The method of claim 1, wherein dynamically configuring the at least one P-CYCLE pattern of the LTE-U carrier comprises the first length of the P-ON duration and the second length of the P-OFF duration that are adjusted in accordance with a number of LTE-U transmissions from the UEs operating in a shared band spectrum further comprises:
selecting an initial maximum first length of the P-ON duration in accordance with a pre-configured value;
counting the number of unsuccessful LTE-U transmissions received from the UEs after transmitting the P-CYCLE pattern of the LTE-U carrier including the P-ON duration of the first length and the P-OFF duration of the second length to the UEs operating in the AP; and updating the first length of the P-ON duration included in the at least one P-CYCLE pattern of the LTE-U carrier in accordance with the number of unsuccessful LTE-U transmissions from the UEs operating in the AP.

6. The method of claim 5, wherein counting the number of unsuccessful LTE-U transmissions received from the UEs after transmitting the P-CYCLE pattern of the LTE-U carrier including the first length of the P-ON duration and the second length of the P-OFF duration to the UEs operating in the AP does not include a number of unsuccessful LTE-U re-transmission from the UEs, the UEs performing a back-off operation based on listen-before-talk (LBT) requirements.

7. The method of claim 1, further comprising:
detecting at least one neighbor AP that performs a discontinuous transmission and reception in the wireless communication system, wherein the AP and the at least one neighbor AP use a same radio access technology deployed in the shared band spectrum; and
coordinating the at least one P-CYCLE pattern of the LTE carrier with the at least one neighbor AP through an inter-network communication path, wherein the at least one P-CYCLE pattern of the LTE carrier comprises the first length of the P-ON duration and the second length of the P-OFF duration.

8. An access point (AP) comprising:
at least one processor configured to:
configure at least one period cycle (P-CYCLE) pattern for a long term evolution in unlicensed spectrum (LTE-U) carrier comprising a period-on (P-ON) duration of the LTE-U carrier when the LTE-U carrier is activated having a first length and a period-off (P-OFF) duration of the LTE-U carrier when the LTE-U carrier is not activated having a second length, the first length and the second length dynamically adjusted based on a number of LTE-U transmissions in a shared band spectrum, wherein the number of LTE-U transmissions comprises a number of successful LTE-U transmissions or a number of unsuccessful LTE-U transmissions;
count the number of successful LTE-U transmissions on the LTE-U carrier received from user equipment (UEs) occurring during the P-ON duration after transmitting the P-CYCLE pattern of the LTE-U carrier including the first length of the P-ON duration and the second length of the P-OFF duration to the UEs operating with the AP;
update the first length of the P-ON duration and the second length of the P-OFF duration included in the at least one P-CYCLE pattern of the LTE-U carrier based on the number of successful LTE-U transmissions occurring during the P-ON duration from the UEs operating with the AP; and
at least one transceiver configured to:
transmit the at least one P-CYCLE pattern of the LTE-U carrier including the updated first length of the P-ON duration and the updated second length of the P-OFF duration to at least one UE using a higher layer signaling or a physical layer signaling; and
receive, from the at least one UE, data in at least one LTE-U transmission occurring during the P-ON duration of the at least one P-CYCLE pattern of the LTE-U carrier including the updated first length of the P-ON duration and the updated second length of the P-OFF duration.

9. The AP of claim 8, wherein the at least one processor further configured to select an initial maximum first length P-ON duration in accordance with a pre-configured value.

10. The AP of claim 9, wherein counting the number of successful LTE-U transmissions received from the UEs after transmitting the P-CYCLE pattern including the first length of the P-ON duration and the second length of the P-OFF duration to the UEs operating in the AP does not include a number of successful LTE-U re-transmissions from the UEs, the UEs performing a back-off operation based on listen-before-talk (LBT) requirements.

11. The AP of claim 9, wherein the at least one processor is configured to update the first length of the P-ON duration included in the at least one P-CYCLE pattern of the LTE carrier in accordance with the number of successful LTE-U transmissions from the UEs operating in the AP by obtaining an updated first length of the P-ON duration in accordance with the following equation:

$$\text{updated P-ON duration} = 2c(\text{initial P-ON duration})$$

where c is the number of successful LTE-U transmissions from the UEs operating in the AP.

12. The AP of claim 8, wherein the at least one processor is configured to dynamically:
select an initial maximum first length of the P-ON duration in accordance with a pre-configured value;
count the number of unsuccessful LTE-U transmissions received from the UEs after transmitting the P-CYCLE pattern of the LTE carrier including the P-ON duration of the first length of the LTE-U carrier and the P-OFF duration of the second length to the UEs operating in the AP; and
update the first length of the P-ON duration included in the at least one P-CYCLE pattern of the LTE-U carrier in accordance with the number of unsuccessful LTE-U transmissions from the UEs operating in the AP.

13. The AP of claim 12, wherein counting the number of unsuccessful LTE-U transmissions received from the UEs after transmitting the P-CYCLE pattern of the LTE carrier including the first length of the P-ON duration and the second length of the P-OFF duration to the UEs operating in the AP does not include a number of unsuccessful LTE-U re-transmission from the UEs, the UEs performing a back-off operation based on listen-before-talk (LBT) requirements.

14. The AP of claim 8, the at least one processor further configured to:
detect at least one neighbor AP that performs a discontinuous transmission and reception in a wireless communication system, wherein the AP and the at least one neighbor AP use a same radio access technology deployed in the shared band spectrum; and
coordinate the at least one P-CYCLE pattern of the LTE carrier with the at least one neighbor AP through an inter-network communication path, wherein the at least one P-CYCLE pattern of the LTE carrier comprises the first length of the P-ON duration and the second length of the P-OFF duration.

15. A user equipment (UE) comprising:
at least one transceiver configured to:
receive at least one P-CYCLE pattern for a long term evolution in unlicensed spectrum (LTE-U) carrier including a period-on (P-ON) duration of the LTE-U carrier when the LTE-U carrier is activated having a first length and a period-off (P-OFF) duration of the LTE-U carrier when the LTE-U carrier is not activated having a second length from an access point (AP) using a higher layer signaling or a physical layer signaling;

transmit an uplink signal in accordance with the P-CYCLE pattern of the LTE-U carrier including the P-ON duration of the LTE-U carrier having the first length and the P-OFF duration of the LTE-U carrier having a second length to the AP using an uplink channel over a shared band spectrum;

receive an updated P-CYCLE pattern of the LTE-U carrier including an updated first length of the P-ON duration and an updated second length of the P-OFF duration from the AP using a downlink channel over the shared band spectrum, wherein the downlink channel comprises a higher layer signal or a physical layer signal, and wherein the updated first length of the P-ON duration and the updated second length of the P-OFF duration are based on a number of LTE-U transmissions comprising a number of successful LTE-U transmissions or a number of unsuccessful LTE-U transmissions occurring during the P-ON duration; and transmit an uplink signal in accordance with the updated P-CYCLE pattern of the LTE-U carrier including the updated first length of the P-ON duration and the updated second length of the P-OFF duration to the AP using an uplink channel over the shared band spectrum.

16. The UE of claim 15, wherein the updated first length of the P-ON duration included in the P-CYCLE pattern of the LTE-U carrier is determined in accordance with the following equation:

$$\text{updated P-ON duration} = 2c(\text{initial P-ON duration})$$

where c is a number of successful LTE-U transmissions from the UEs operating in the AP.

17. The UE of claim 15, wherein the updated first length of the P-ON duration included in the P-CYCLE pattern of the LTE carrier is determined in accordance with the following equation:

$$\text{updated P-ON duration} = 2^c - 1(\text{initial P-ON duration})$$

where c is a number of successful LTE-U transmissions from the UEs operating in the AP.

18. The UE of claim 15, wherein the updated first length of the P-ON duration included in the P-CYCLE pattern of the LTE carrier is determined in accordance with the following equation:

$$\text{updated P-ON duration} = c+1$$

where c is a number of successful LTE-U transmissions from the UEs operating in the AP.

19. The UE of claim 15, wherein the updated first length of the P-ON duration included in the P-CYCLE pattern of the LTE carrier is determined in accordance with the following equation:

$$\text{updated P-ON duration} = \text{floor}(\log(c+1))(\text{initial P-ON duration})$$

where c is a number of successful LTE-U transmissions from the UEs operating in the AP.

20. The UE of claim 15, wherein the first length of the P-ON duration and the second length of the P-OFF duration are dynamically adjusted based on the number of LTE-U transmissions comprising the number of successful LTE-U transmissions or the number of unsuccessful LTE-U transmissions occurring during the P-ON duration in the shared band spectrum.

* * * * *